US010218092B2

(12) United States Patent
Salkovic et al.

(10) Patent No.: US 10,218,092 B2
(45) Date of Patent: Feb. 26, 2019

(54) CABLE TERMINAL PROTECTION ARRANGEMENT

(71) Applicant: VOLVO CAR CORPORATION, Gothenburg (SE)

(72) Inventors: Edvin Salkovic, Gothenburg (SE); Ivan Tomic, Partille (SE); Lars Gunnarsson, Vargarda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/979,996

(22) Filed: May 15, 2018

(65) Prior Publication Data

US 2018/0337466 A1   Nov. 22, 2018

(30) Foreign Application Priority Data

May 22, 2017 (EP) .................... 17020222

(51) Int. Cl.
| H01R 4/70 | (2006.01) |
| H01R 43/20 | (2006.01) |
| H01R 4/34 | (2006.01) |
| H01R 11/12 | (2006.01) |

(52) U.S. Cl.
CPC ............. *H01R 4/70* (2013.01); *H01R 4/34* (2013.01); *H01R 11/12* (2013.01); *H01R 43/20* (2013.01)

(58) Field of Classification Search
CPC . H01R 4/70; H01R 4/34; H01R 11/12; H01R 43/20; H01R 4/302
USPC ........................................................ 439/750
See application file for complete search history.

(56) References Cited

U.S. PATENT DOCUMENTS

| 4,883,431 A * | 11/1989 | Uken .................. H01R 4/70 |
| | | 439/521 |
| 5,191,172 A | 3/1993 | Garganese |
| 6,027,382 A * | 2/2000 | Reindl .................. B23K 9/20 |
| | | 439/793 |

(Continued)

FOREIGN PATENT DOCUMENTS

| EP | 0 895 305 A1 | 2/1999 |
| EP | 2 063 492 A2 | 5/2009 |

OTHER PUBLICATIONS

Extended European Search Report dated Nov. 27, 2017, Application No. 17020222.0-1809, Applicant Volvo Car Corporation, 9 Pages.

*Primary Examiner* — Harshad C Patel
(74) *Attorney, Agent, or Firm* — Brooks Kushman P.C.

(57) ABSTRACT

A cable terminal protection arrangement according to the disclosure comprises a cable terminal and a cable terminal protector to protect the cable terminal. The cable terminal comprises an end piece. The cable terminal protector comprises a housing and a suspension unit located within the housing. The suspension unit comprises a holding element for holding the end piece and an arm connecting the holding element to the housing. The holding element is displaceable relative to the housing from a first position to a second position, wherein, in the first position, a major portion of a second surface of the end piece is covered by the holding element, and in the second position, the end piece is outside the holding element. The disclosure also relates to a kit comprising the cable terminal protection arrangement and a fastening element, and to a method of attaching the cable terminal protection arrangement to an object.

20 Claims, 2 Drawing Sheets

(56) References Cited

U.S. PATENT DOCUMENTS

| | | | | |
|---|---|---|---|---|
| 6,079,923 A | * | 6/2000 | Ross | F16B 4/004 |
| | | | | 411/107 |
| 6,386,902 B2 | * | 5/2002 | Nagayasu | H01R 4/22 |
| | | | | 439/125 |
| 7,946,895 B2 | * | 5/2011 | Hain | H01R 4/301 |
| | | | | 439/793 |
| 8,636,550 B2 | * | 1/2014 | Onoda | H01R 13/447 |
| | | | | 439/762 |
| 2006/0239794 A1 | * | 10/2006 | Dolzer | H01R 4/305 |
| | | | | 411/81 |
| 2008/0118325 A1 | * | 5/2008 | Opper | H01R 4/302 |
| | | | | 411/103 |
| 2011/0053434 A1 | * | 3/2011 | Seng | H01R 4/305 |
| | | | | 439/793 |

\* cited by examiner

US 10,218,092 B2

CABLE TERMINAL PROTECTION ARRANGEMENT

CROSS-REFERENCE TO RELATED APPLICATIONS

This application claims foreign priority benefits under 35 U.S.C. § 119(a)-(d) to European patent application number EP 17020222.0, filed May 22, 2017, which is incorporated by reference in its entirety.

TECHNICAL FIELD

The present disclosure relates to a cable terminal protection arrangement comprising a cable terminal and a cable terminal protector adapted to protect the cable terminal. The disclosure also relates to a kit comprising the cable terminal protection arrangement and a fastening element. The disclosure further relates to a method of attaching the cable terminal protection arrangement to an object, e.g., a vehicle body.

BACKGROUND

When manufacturing a vehicle, such as a car, a cable is connected to a battery of the vehicle. It is thereafter desirable to protect the other end of the cable, usually ending in a cable terminal, from uncontrolled grounding, e.g., against the vehicle body. Therefore a cable terminal protector may be used to enclose the cable terminal in order to protect it. It may also be interesting to protect other cable terminals in a corresponding way.

A commonly used cable terminal protector partly surrounds the cable terminal during factory handling and logistics. Further the cable terminal protector is configured such that the cable terminal is easy to attach when grounding is desired, i.e., for intentional grounding. However, there is still a risk of uncontrolled grounding, since the cable terminal is at least partly exposed to the environment.

Patent document U.S. Pat. No. 5,191,172 discloses a cable terminal protector, comprising two generally rectangular main members joined at one end by a hinge, which gives good protection from unintentional grounding. However, in order to connect the cable terminal to the vehicle body, the cable terminal protector of U.S. Pat. No. 5,191,172 has to be removed manually, resulting in an extra manufacturing step, which costs time and effort.

It is thus desirable to provide a cable terminal protector which gives good protection from unintentional grounding during factory handling and logistics and yet makes it easy to connect the cable terminal to an object, such as a vehicle body, for intentional grounding.

In addition, it is desirable that the cable terminal protector is able to ascertain a stable position of the cable terminal in the cable terminal protector, such that a cable terminal protection arrangement comprising the cable terminal and the cable terminal protector can withstand external forces applied to the cable terminal protector or to the cable without being deformed or broken and such that the cable terminal is still protected.

It is also desirable that the cable terminal is connected to the object in a clean connection for the intentional grounding, i.e., without a potential risk that parts of the cable terminal protector end up in between the cable terminal and the object, thus at least partly destroying the electrical connection.

SUMMARY

An object of the present disclosure is to overcome or ameliorate at least one of the disadvantages of the prior art, or to provide a useful alternative.

Thus, the present disclosure relates to a cable terminal protection arrangement comprising a cable terminal and a cable terminal protector adapted to protect the cable terminal. The cable terminal is attachable or attached to an end of a cable, e.g., a battery cable. The cable terminal comprises a flat-shaped end piece with a first surface and a second surface being opposite to the first surface. The end piece comprises a through-going hole adapted for insertion of a fastening element, such as a screw or bolt. The cable terminal protector comprises a housing with a cable opening for receiving the cable and a tool opening. The first surface of the end piece is adapted to face the tool opening and the second surface is adapted to face away from the tool opening. The cable terminal protection arrangement further comprises a suspension unit located within the housing. The suspension unit comprises a holding element for holding the end piece and an arm connecting the holding element to the housing. The holding element is displaceable in relation to the housing from a first position to a second position, wherein, in the first position, a major portion of the second surface of the end piece is covered by the holding element, and in the second position, the end piece is outside the holding element.

The cable terminal protector is made of an electrically insulating material, e.g., plastics such as polypropylene, such that the cable terminal protector is able to electrically insulate the cable terminal, as long as the cable terminal is covered. The housing gives an outer protection for the cable terminal from the ambient environment.

The fastening element is to be used for connecting the cable terminal to the object, i.e., for intentional grounding. It may be a screw or a bolt, e.g., a flanged screw or bolt.

The first position of the holding element is used during factory handling and logistics of the cable terminal protection arrangement. The second position is used when the intentional grounding is to be obtained, i.e., when the cable terminal is to be attached to the object, e.g., the vehicle body.

In the first position of the holding element, a major portion of the second surface of the end piece is covered by the holding element. This provides good protection from unintentional grounding during factory handling and logistics. At least 70% of the second surface of the end piece may be covered by the holding element, preferably at least 80%, more preferably at least 90%, most preferably at least 95%.

The suspension unit ascertains a stable position of the cable terminal in the cable terminal protector when the holding element is in the first position, by holding the end piece in a pre-determined position. Thereby a cable terminal protection arrangement comprising the cable terminal and the cable terminal protector can withstand external forces applied to the cable terminal protector or to the cable. In particular, the risk that the cable terminal would fall out of the cable terminal protector is avoided or at least reduced as compared to prior art.

In the second position of the holding element, the end piece of the cable terminal can pass the holding element. Thereby the cable terminal can be connected to the object to obtain the intentional grounding. Since the holding element is displaced out of the way, the risk that parts of the cable terminal protector would end up in between the cable terminal and the object, thus at least partly destroying the electrical connection, is avoided or at least reduced as compared to prior art.

When moving from the first position to the second position, the holding element is displaced in relation to the housing. Preferably this displacement occurs mainly in a plane being parallel to the tool opening and thus typically being perpendicular to the cable opening, such that the holding element is moved to the side as seen in relation to an axial direction of the fastening element.

Preferably also the holding element comprises a through-going hole adapted for insertion of the fastening element. The hole is preferably shaped after the fastening element. Hence, the hole of the holding element may mimic the whole or a portion of the through-going hole of the end piece.

The tool opening allows a tool, such as a socket, to enter the housing, such that the end piece can be attached to an object, e.g., the vehicle body, by means of the tool operating on the fastening element, e.g., screwing the fastening element into the object by means of a socket adapted to cooperate with the fastening element. The holding element is aligned with the tool opening, such that there is access to the cable terminal with the fastening element. Preferably, the tool opening faces in a direction being perpendicular to, or substantially perpendicular to, a facing direction of the cable opening.

The holding element is preferably shaped to hold the end piece in a stable position in the housing when the holding element is in its first position. The holding element may thus comprise a proximal portion facing the first surface of the end piece and a distal portion facing the second surface of the end piece, thus being parallel to the proximal portion. The proximal portion and the distal portion may be connected by an intermediate portion corresponding to the thickness of the end piece.

As mentioned above, the holding element is displaceable from the first position to the second position. In addition, the holding element may be displaceable from the second position back to the first position. Thereby the holding element can move back to the first position when the end piece has passed the holding element, e.g., to be connected to the object. Further, it is preferred that the holding element is able to move a plurality of times between the first and second positions, which may be useful if it is desired to release the attachment of the cable terminal to the object and to re-attach it again.

The holding element may be biased towards the first position, e.g., spring-biased. The arm of the suspension unit may be flexible, preferably resiliently flexible. Thereby the arm has a spring function, which may bias the holding element towards the first position.

The holding elements may be biased towards the first positions by the flexible properties and/or the shape of the arm. Thereby, the arm may function as a spring pushing the holding element towards the first position. The arm may be shaped such that it is curved towards a center-plane being perpendicular to the tool opening and to the cable opening. This shape helps to control the movement of the displacement of the holding elements to the second position. The arm is preferably resiliently flexible, such that it strives to go back to the first position of the holding element.

The housing has an extension h in a first direction $D_1$, which is perpendicular to a plane spanning the tool opening. The arm may be connected to the housing at a distance d from the tool opening as seen in the first direction $D_1$, which distance d is less than a distance e to the holding element as seen in the first direction $D_1$. Preferably the distance d is in the range of $0 \leq d < 0.5$ h, more preferably $0 \leq d < 0.3$ h, most preferably $0 \leq d < 0.1$ h. It has been found beneficial that the arms are connected to a top portion of the housing, i.e., the portion of the housing comprising the tool opening.

The arm may comprise a bore facing the tool opening. The bore may help to guide the fastening element during insertion. The bore is preferably aligned with the through-going hole of the end piece and/or with the through-going hole of the holding element, such that the fastening element may be inserted through the bore of the arm and the respective through-going holes.

The cable terminal protection arrangement may comprise an additional suspension unit comprising an additional holding element and an additional arm, preferably the additional suspension unit being a mirror image of the suspension unit, e.g., as seen in the center-plane being perpendicular to the tool opening and to the cable opening of the housing. If using two holding elements located opposite to each other and being each other's mirror image, it has been found beneficial that an interspace between the two holding elements is less than 2 mm, preferably less than 1.5 mm at the portion of the holding element covering the second surface of the end piece.

The housing may comprise, or be constituted by, a first portion and a second portion, the first portion being adapted to face the first surface of the end piece and the second portion being adapted to face the second surface of the end piece, the first portion comprising the tool opening. Preferably, the first and the second portions are snap-fittable to each other.

The usage of a first portion and a second portion of the housing makes it easy to fit the cable terminal protector around the cable terminal. The first portion may form a top portion and the second portion may form a bottom portion of the cable terminal protector. The suspension unit may be comprised in the first portion, either as an integral part or as a separate component attached to the first portion. In that case, the cable terminal may first be inserted in the holding element and then the second portion may be snap-fitted to the first portion from either side of the cable terminal to form the cable terminal protection arrangement described herein. The cable opening may in that case be located partly in the first and partly in the second portion.

The cable terminal may comprise a second portion located adjacent to the end piece. In that case, the cable terminal protection arrangement may comprise an abutment located spaced apart from the suspension unit, such that the second portion of the cable terminal is adapted to abut the abutment. The abutment may thus support the second portion of the cable terminal. This helps to keep a fix and secure attachment of the cable to the cable terminal protector. The abutment may be a separate component located inside the housing. However, it is preferred that the abutment is integral with the housing, e.g., integral with the first portion.

The present disclosure further relates to a kit comprising the cable terminal protection arrangement as described herein and a fastening element, e.g., a screw or a bolt. The fastening element has at first portion, e.g., a stem, with a first radius and a second portion with a second radius being larger than the first radius, wherein the first radius is configured to pass through the through-going hole of the end piece of the cable terminal and the second radius is configured to cooperate with the arm of the suspension unit during the displacement of the holding element from the first position to the second position.

The fastening element extends in an axial direction. The fastening element is inserted by being attached to the object, e.g., the vehicle body. If the fastening element is threaded, e.g., being a screw or a bolt, the fastening element is inserted by screwing. During insertion of the fastening element, the portion of the fastening element having the second radius pushes the holding element to the second position by acting on the arm of the suspension unit, preferably by gradually pushing the arm. The fastening element may be inserted with the help of a tool, e.g., a socket, configured to cooperate with the fastening element, e.g., being shaped to grip a head of the screw or bolt.

The fastening element may be a flanged screw or a flanged bolt. In that case, the first radius is a radius of the stem of the fastening element and the second radius is a radius of a flange of the fastening element.

The present disclosure also relates to a method of attaching a cable terminal protection arrangement as described herein to an object, e.g., a vehicle body. The method comprises:

a) Providing a fastening element, e.g., a screw or a bolt;
b) Positioning the cable terminal protection arrangement on the object with the tool opening facing away from the object;
c) Inserting the fastening object through the tool opening and through the through-going hole of the end piece, which is held by the holding element being in the first position;
d) Displacing the holding element to the second position by means of further insertion of the fastening element; and
e) Attaching the end piece to the object by means of further insertion of the fastening element.

Step d) may be performed by the fastening element acting on the arm of the suspension unit, thereby displacing the holding element to the second position.

If it for some reason is desirable to release the end piece from the object, the holding elements may be pushed to the second position by the socket, such that the fastening element and the end piece can be displaced to a position in which the holding element once again holds the end piece. If two holding elements are provided, the fastening element and the end piece may then pass between the holding elements.

BRIEF DESCRIPTION OF THE DRAWINGS

Embodiments according to the present disclosure will hereinafter be further explained by means of non-limiting examples with reference to the appended drawings.

It should be noted that the appended drawings are schematic and that individual components are not necessarily drawn to scale and that the dimensions of some features

DETAILED DESCRIPTION

The disclosure will, in the following, be exemplified by embodiments. It should however be realized that the embodiments are included in order to explain principles of the disclosure and not to limit the scope of the disclosure, as defined by the appended claims. A feature from one embodiment may be combined with one or more features of any other embodiment.

Figure 1:
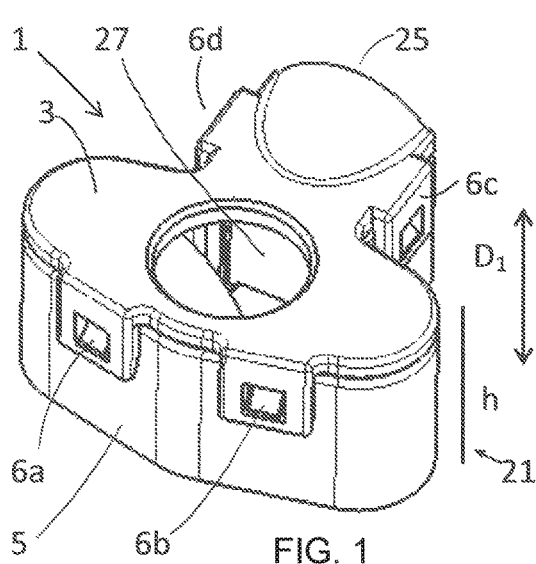
FIG. 1 is a perspective view of a cable terminal protector.
Figure 2:
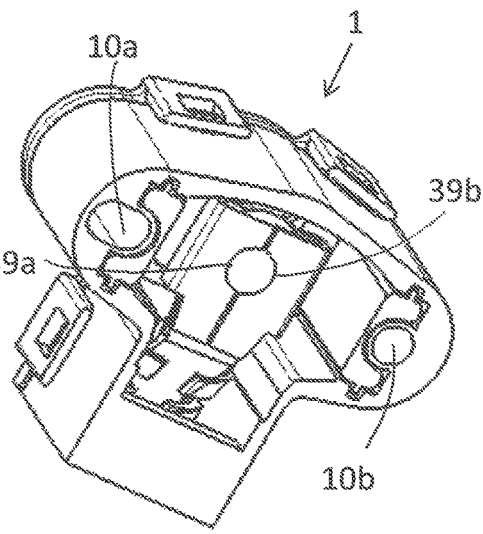
FIG. 2 is another perspective view of the cable terminal protector.
Figure 3:
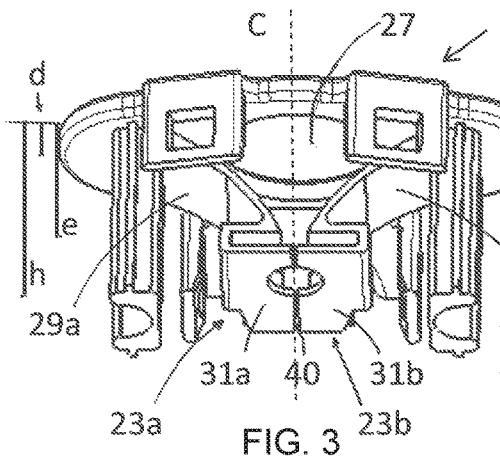
FIG. 3 is a perspective view of a first portion of the cable terminal protector.
Figure 4:
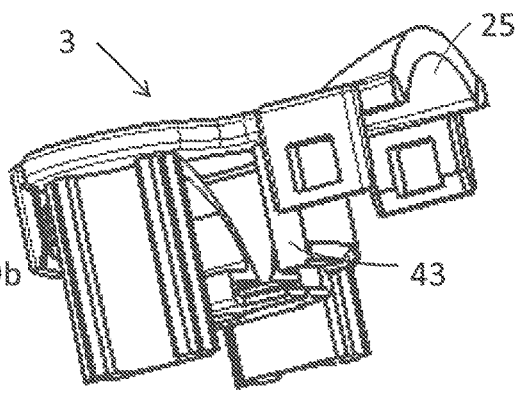
FIG. 4 is another perspective view of the first portion of the cable terminal protector.
Figure 5:
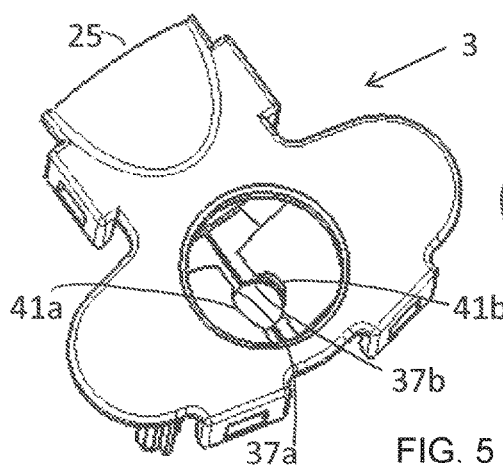
FIG. 5 is yet another perspective view of the first portion of the cable terminal protector.

FIGS. 1 and 2 illustrate a cable terminal protector 1. The cable terminal protector 1 comprises a first portion 3 and a second portion 5, which are snap-fitted together by means of cooperating snap fit units 6a, 6b, 6c, 6d located in the first portion 3 and second portion 5, respectively. FIGS. 3-5 illustrate the first portion 3 from three different perspectives. The cable terminal protector 1 is utilized to protect a cable terminal 7, see FIG. 6. The cable terminal 7 is attached to an end of a cable 9, which e.g., may be a battery cable of a vehicle. The cable terminal protector 1 and the cable terminal 7 together form a cable terminal protection arrangement according to the disclosure.

The second portion 5 of the cable terminal protector 1 is provided with one or more bores, illustrated as a pair of bores 10a, 10b, which are intended to receive a respective pin located on an object, such as a vehicle body, to which the cable terminal protection arrangement is to be attached.

Figure 6:
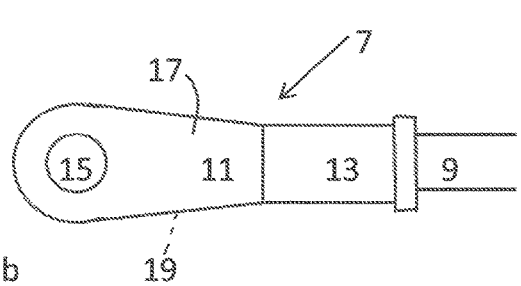
FIG. 6 is a top view of a cable terminal.

The cable terminal 7 comprises a flat-shaped end piece 11 and a second portion 13 located next to the end piece 11, see FIG. 6. The second portion 13 is typically angled in relation to the end piece 11, e.g., by an angle in the range of 20°-60°. In the illustrated embodiment, the cable 9 is attached to the second portion 13 of the cable terminal 7, but there may also be other portions in between. The end piece 11 comprises a through-going hole 15 which is adapted for insertion of a fastening element, such as a screw or a bolt, which is utilized to attach the cable terminal 7 to the object, such as the vehicle body. This is further described below in conjunction with FIGS. 7A-7D. The end piece 11 has a first surface 17 and a second surface 19, which is opposite to the first surface 17.

The cable terminal protector 1 comprises a housing 21, see FIG. 1, and a pair of suspension units 23a, 23b, see FIG. 3. The housing 21 gives an outer protection for the cable terminal 7 from the ambient environment. The cable terminal protector 1 is made of an electrically insulating material, e.g., plastics such as polypropylene, such that the cable terminal protector 1 electrically insulates the cable terminal 7. In the illustrated embodiment the housing 21 is formed by the outer walls of the first portion 3 and second portion 5. The housing 21 comprises a cable opening 25, see FIG. 5, located partly in the first portion 3 and partly in the second portion 5, which allows the cable 9 to enter into the cable terminal protector 1. The housing 21 further comprises a tool opening 27, see FIGS. 1 and 3, located in the first portion 3, which makes it possible to use a tool, such as a socket, to attach the fastening element to the object, which is further described below in conjunction with FIGS. 7A-7D. The tool opening 27 typically faces in a direction being perpendicular or substantially perpendicular to a facing direction of the cable opening 25. When the cable terminal 7 is positioned in the cable terminal protector 1, the first surface 17 of the end piece 11 faces the tool opening 27.

The suspension units 23a, 23b, shown in FIGS. 3 and 7a-d, are used to hold the end piece 11 of the cable terminal 7 in a desired position. Each suspension unit 23a, 23b comprises a respective arm 29a, 29b and a respective holding element 31a, 31b, with the arms 29a, 29b connecting the holding elements 31a, 31b to the housing 21. The two suspension units 23a, 23b are mirror images of each other, as e.g., seen in FIG. 3, wherein the two suspension units 23a, 23b are mirrored in a center-plane C being perpendicular to both the tool opening 27 and to the cable opening 25.

The holding elements 31a, 31b are shaped to hold the end piece 11. See FIG. 7A for details of the suspension units 23a, 23b. Since two holding elements 31a, 31b are utilized, each of them will hold half of the end piece 11. Each holding element 31a, 31b comprises a proximal portion 33a, 33b facing the first surface 17 of the end piece 11 and a distal portion 35a, 35b facing the second surface 19 of the end piece 11. The proximal portion 33a, 33b and the distal portion 35a, 35b are connected by an intermediate portion 36a, 36b. The arm 29a, 29b is connected to the proximal portion 33a, 33b. The proximal portions 33a, 33b have through-going holes 37a, 37b, see FIG. 5. Each of the holes 37a, 37b is adapted to the shape of a half of the fastening element, such that the holes 37a, 37b together are adapted to allow insertion of the fastening element. The holes 37a, 37b are therefore to be aligned with the through-going hole 15 of the end piece 11. Correspondingly, the distal portions 35a, 35b have through-going holes 39a, 39b, see FIG. 2, which are aligned with the holes 37a, 37b shown in FIG. 5 of the proximal portions 33a, 33b.

Figure 7A:
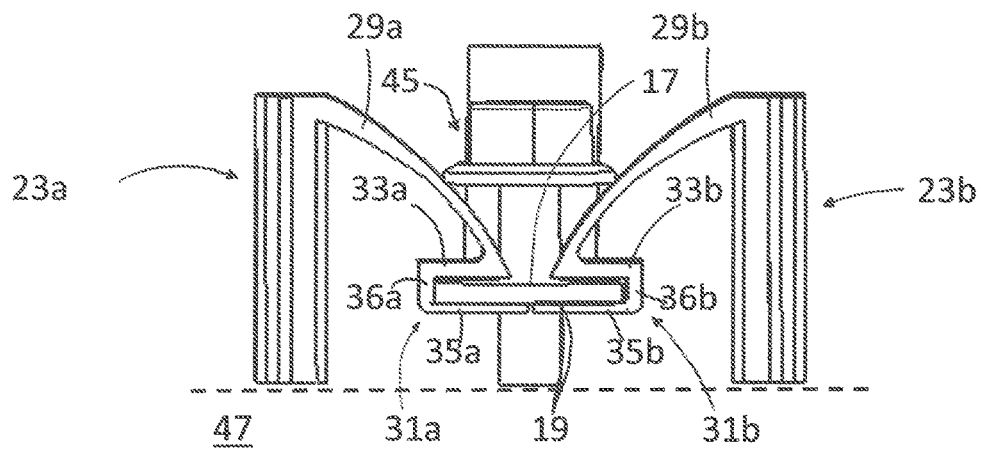
FIGS. 7A-7D illustrate two suspension units of the cable terminal protector and a fastening element when attaching the cable terminal to an object.
Figure 7B:
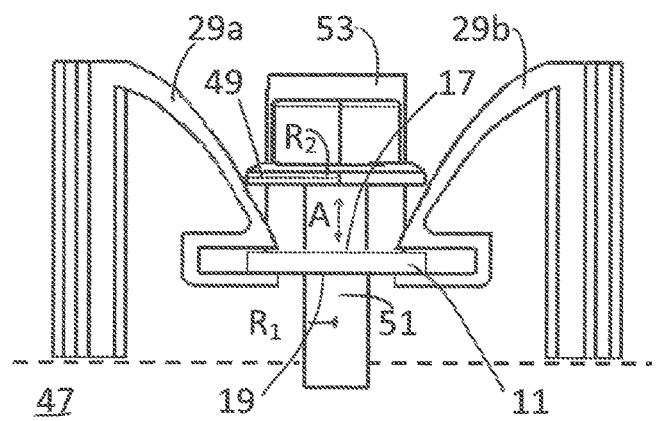
Figures 7C, 7D:
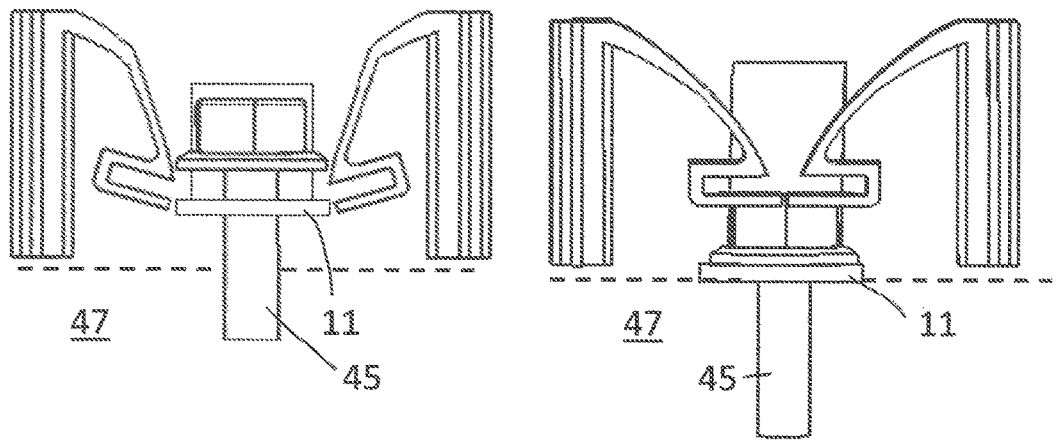

The holding element 31a, 31b may assume a first position, as illustrated in FIGS. 1-5, 7a and 7d and a second position, as illustrated in FIG. 7C. In the first position, a major portion of the second surface 19 of the end piece 11 is covered by the distal portions 35a, 35b of the holding element 31a, 31b, in the illustrated embodiment substantially all of the second surface 19. It has been found beneficial that an interspace 40 between the two holding elements 31a, 31b in that position is less than 2 mm, preferably less than 1.5 mm. Thereby the cable terminal 7 is electrically insulated as seen from a bottom of the cable terminal protector 1, which can be seen in FIGS. 2-3. See also FIG. 7A.

The holding elements 31a, 31b are biased to the first positions by the flexible properties and the shape of the arms 29a, 29b. Thereby the arms 29a, 29b function as springs pushing the two holding elements 31a, 31b towards each other. The arms 29a, 29b are shaped such that they are curved towards the center-plane C being perpendicular to the tool opening 27 and to the cable opening 25. See FIG. 3. This shape helps to control the displacement of the holding elements 31a, 31b to their respective second positions, which is further described below in conjunction with FIGS. 7A-7D. The arms 29a, 29b are preferably resiliently flexible, such that they strive to go back to the first positions of the holding elements 31a, 31b. Further, it is preferred that the arms 29a, 29b are capable of moving a plurality of times between the first and second positions, which may be useful if it is desired to release the attachment of the cable terminal 7 to the object, e.g., the vehicle body and to re-attach it.

The housing 21 has an extension h in a first direction $D_1$, which is perpendicular to a plane spanning the tool opening 27. See FIGS. 1 and 3. The arms 29a, 29b are connected to the housing 21 at a distance d from the tool opening 27 as seen in the first direction $D_1$. This distance d is less than a distance e to the holding element 31a, 31b, which is determined from the tool opening 27 to the geometrical center of the holding element 31a, 31b as seen in the first direction $D_1$. In addition, preferably the distance d is in the range of $0 \leq d < 0.5$ h, more preferably $0 \leq d < 0.3$ h, most preferably $0 \leq d < 0.1$ h.

The respective arm 29a, 29b comprises a bore 41a, 41b shown in FIG. 5, which faces the tool opening 27 and is aligned with the holes 37a, 37b of the proximal portions 33a, 33b and the holes 39a, 39b shown in FIG. 2 of the distal portions 35a, 35b of the holding elements 31a, 31b. The bores 41a, 41b will help to guide the fastening element during attachment, which is further described below in conjunction with FIGS. 7A-7D.

As an option, disclosed in the illustrated embodiment, the cable terminal protector 1 may comprise an abutment 43, which in the illustrated embodiment is formed as an integral unit with the first portion 23, see FIG. 4. The abutment 43 supports the second portion 13 of the cable terminal 7. This helps to keep a fixed and secure attachment of the cable 9 to the cable terminal protector 1.

FIGS. 7A-7D illustrate the two suspension units 23a, 23b and the fastening element 45 when attaching the cable terminal arrangement comprising the cable terminal protector 1 and the cable terminal 7 to an object 47, such as a vehicle body, indicated by a dashed line in FIGS. 7A-7D.

First the fastening element 45 is provided. In the illustrated embodiment, the fastening element 45 is a flanged bolt. It extends in an axial direction A and comprises a stem 51 with a first radius $R_1$, which is adapted to fit inside the hole 15 of the end piece 11. The fastening element 45 also has a second radius $R_2$, which is larger than the first radius $R_1$. In the illustrated embodiment, the second radius $R_2$ is given by a radius of a flange 49 of the fastening element 45. See FIG. 7B for details of the fastening element 45.

The cable terminal arrangement comprising the cable terminal protector 1 and the cable terminal 7 is positioned on the object with the tool opening 27 facing away from the object 47. Thereby, the above-mentioned bores 10a, 10b of the second portion 5 of the cable terminal protector 1 are placed over corresponding pins located on the object (not illustrated).

The fastening element 45 is inserted through the tool opening 27 into the through-going hole 15 of the end piece 11, in the illustrated embodiment by screwing of the flanged bolt 45. As long as the flange 49 is above the arms 29a, 29b, the holding elements 31a, 31b are in the first positions, in which they electrically insulate the cable terminal 7. See FIG. 7A. The fastening element 45 may be inserted with the help of a socket 53 configured to cooperate with the fastening element 45.

Once the flange 49 reaches the arms 29a, 29b by further insertion of the fastening element 45, the flange 49 starts acting on the arms 29a, 29b by pushing the arms 29a, 29b to the side, see FIG. 7B. Thereby, the holding elements 31a, 31b are displaced towards the second positions. The displacement motion is governed by the curved shape of the arms 29a, 29b. With the illustrated curvature, there is a faster sideways displacement at the beginning of the displacement towards the second positions than at the end of the displacement.

Eventually, the holding elements 31a, 31b reach the second position, see FIG. 7C. They are then so far spaced apart that the end piece 11 can pass between the holding elements 31a, 31b. The end piece 11 therefore leaves the holding elements 31a, 31b and instead moves together with the fastening element 45 until the fastening element 45 is attached to the object 47. Then the end piece 11 is in electrical contact with the object 47. See FIG. 7d. The cable terminal protector 1 is held in position by means of the pins located on the object cooperating with the bores 10a, 10b of the second portion 5, not illustrated.

If it for some reason is desirable to release the end piece 11 from the object 47, the holding elements 31a, 31b may be pushed to the second position by the socket 53, such that the fastening element 45 and the end piece 11 can pass upwards between the holding elements 31a, 31b.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. A cable terminal protection arrangement comprising:
a cable terminal that is attachable to an end of a cable, the cable terminal comprising a flat-shaped end piece with a first surface and a second surface, being opposite to the first surface, the end piece having a through-going hole configured for insertion of a fastening element;
a cable terminal protector configured to protect the cable terminal, the cable terminal protector comprising a housing having a cable opening for receiving the cable and a tool opening; and
a suspension unit located within the housing and comprising a holding element for holding the end piece and an arm connecting the holding element to the housing, the holding element being displaceable in relation to the housing from a first position to a second position;
wherein, in the first position, the holding element is configured to cover a major portion of the second surface of the end piece when the end piece is received by the holding element, and, in the second position, the end piece is positionable outside the holding element, and wherein, when the end piece is received in the cable terminal protector, the first surface of the end piece is configured to face the tool opening of the cable terminal protector, and the second surface of the end piece is configured to face away from the tool opening.

2. The cable terminal protection arrangement according to claim 1 wherein, in the first position, the holding element is configured to cover at least 70% of the second surface of the end piece when the end piece is received in the holding element.

3. The cable terminal protection arrangement according to claim 1 wherein, in the first position, the holding element is configured to cover at least 80% of the second surface of the end piece when the end piece is received in the holding element.

4. The cable terminal protection arrangement according to claim 1 wherein, in the first position, the holding element is configured to cover at least 90% of the second surface of the end piece when the end piece is received in the holding element.

5. The cable terminal protection arrangement according to claim 1 wherein the holding element has a through-going hole configured for insertion of the fastening element.

6. The cable terminal protection arrangement according to claim 1 wherein the holding element is biased towards the first position.

7. The cable terminal protection arrangement according to claim 1 wherein the arm of the suspension unit is flexible.

8. The cable terminal protection arrangement according to claim 1 wherein the arm has a curved shape so that the arm is curved in a direction towards a center-plane that is perpendicular to the tool opening and to the cable opening of the housing.

9. The cable terminal protection arrangement according to claim 1 wherein the arm is connected to the housing at a distance d from the tool opening, as seen in a first direction which is perpendicular to a plane spanning the tool opening, and wherein the distance d is less than a distance e to the holding element as seen in the first direction.

10. The cable terminal protection arrangement according to claim 9 wherein the housing has an extension h in the first direction, and the distance d is in the range of $0 \leq d < 0.5\, h$.

11. The cable terminal protection arrangement according to claim 10 wherein the distance d is in the range of $0 \leq d < 0.3\, h$.

12. The cable terminal protection arrangement according to claim 1 wherein the arm comprises a bore facing the tool opening.

13. The cable terminal protection arrangement according to claim 1 further comprising an additional suspension unit comprising an additional holding element and an additional arm, wherein the additional suspension unit is a mirror image of the suspension unit.

14. The cable terminal protection arrangement according to claim 1 wherein the housing comprises a first portion and a second portion, the first portion being configured to face the first surface of the end piece and the second portion being configured to face the second surface of the end piece, and wherein the first portion defines the tool opening.

15. The cable terminal protection arrangement according to claim 1, wherein the cable terminal comprises a second portion located adjacent to the end piece, and the cable terminal protection arrangement comprises an abutment located spaced apart from the suspension unit, and wherein the second portion of the cable terminal is configured to abut the abutment.

16. A kit comprising the cable terminal protection arrangement according to claim 1 and a fastening element, the fastening element having a first portion with a first radius and a second portion with a second radius that is larger than the first radius, wherein the first radius is configured to pass through the through-going hole of the end piece of the cable terminal and the second radius is configured to cooperate with the arm of the suspension unit during the displacement of the holding element from the first position to the second position.

17. The kit according to claim 16 wherein the fastening element is a flanged screw or a flanged bolt, and the first radius is a radius of a stem of the fastening element and the second radius is a radius of a flange of the fastening element.

18. A method of attaching a cable terminal protection arrangement to an object, wherein the cable terminal protection arrangement includes a cable terminal and a cable terminal protector configured to protect the cable terminal, the cable terminal being attachable to an end of a cable and including a flat-shaped end piece having a first surface, a second surface opposite to the first surface, and a through-going hole, the cable terminal protector including a housing and a suspension unit located within the housing, the housing having a cable opening for receiving the cable and a tool opening, the suspension unit including a holding element for holding the end piece and an arm connecting the holding element to the housing, the holding element being displaceable in relation to the housing from a first position to a second position, wherein, in the first position, the holding element is configured to cover a portion of the second surface of the end piece when the end piece is received by the holding element, and, in the second position, the end piece is positionable outside the holding element, and wherein, when the end piece is received in the cable terminal protector, the first surface of the end piece is configured to face the tool opening of the cable terminal protector, and the second surface of the end piece is configured to face away from the tool opening, the method comprising:
a) providing a fastening element;
b) positioning the cable terminal protection arrangement on the object with the end piece of the cable terminal received in the cable terminal protector and with the tool opening of the cable terminal protector facing away from the object;

c) inserting the fastening element through the tool opening and through the through-going hole of the end piece, which is held by the holding element being in the first position;
d) displacing the holding element to the second position by means of further insertion of the fastening element; and
e) attaching the end piece to the object by means of further insertion of the fastening element.

19. The method according to claim 18, wherein the step d) is performed by the fastening element acting on the arm of the suspension unit, thereby displacing the holding element to the second position.

20. A cable terminal protection arrangement comprising:
a cable terminal that is attachable to an end of a cable, the cable terminal including a flat-shaped end piece having a first surface, a second surface opposite the first surface, and a through-going hole configured for insertion of a fastening element; and
a cable terminal protector configured to protect the cable terminal, the cable terminal protector including a housing and at least one suspension unit located within the housing, the housing having a cable opening for receiving the cable and a tool opening, each of the at least one suspension unit including a holding element for holding the end piece and an arm connecting the holding element to the housing, the holding element being displaceable in relation to the housing from a first position to a second position, wherein, in the first position, the holding element is configured to cover a portion of the second surface of the end piece when the end piece is received by the holding element, and, in the second position, the end piece is positionable outside the holding element, and wherein, when the end piece is received in the cable terminal protector, the first surface of the end piece is configured to face the tool opening of the cable terminal protector, and the second surface of the end piece is configured to face away from the tool opening.

* * * * *